Oct. 20, 1942.   J. T. MARVIN   2,299,638
FLUID SEALING DEVICE
Filed March 29, 1940

INVENTOR
JOHN T. MARVIN
BY
ATTORNEYS

Patented Oct. 20, 1942

2,299,638

UNITED STATES PATENT OFFICE 2,299,638

FLUID SEALING DEVICE

John T. Marvin, Dayton, Ohio, assignor to General Motors Corporation, Detroit, Mich., a corporation of Delaware Application March 29, 1940, Serial No. 326,711

1 Claim. (Cl. 286—11)

This invention relates to fluid sealing devices and is particularly concerned with devices wherein the parts thereof are self-contained.

It is an object of the invention to provide a fluid seal assembly which includes a resilient sealing member that contains a spring, said spring being adapted to act upon said sealing member for simultaneously expanding the member axially and for radially changing the diameter of a portion of the member.

In carrying out the above object it is a further object in some cases to provide a circumferential groove in the sealing member adapted to receive one end of the spring.

Further objects and advantages of the present invention will be apparent from the following description, reference being had to the accompanying drawing wherein preferred embodiments of the present invention are clearly shown.

Fluid seals of the type used to seal refrigerator compressors, automotive water pumps, washing machine drive shafts and the like, are required to perform the dual function of sealing simultaneously at two points remote from one another and likewise are required to be inexpensive and flexible with regard to installation.

Fluid seals of this type are shown in copending application, Serial No. 168,910, now matured into Patent No. 2,263,178, and in Patent No. 2,167,986, both assigned to the assignee of the present invention. In application, Serial No. 168,910, an assembly is described wherein the spring is of a cylindrical type which bears concomitantly upon two end flanges of a sealing member. In Patent No. 2,167,986, a seal assembly is shown wherein a circumferential spring is provided in the sealing member at one end thereof, for providing a definite shape and giving resiliency thereto and holding the flange in an annular groove in the housing, if desired. The present invention is particularly directed to a fluid seal wherein the desirable qualities of both of the aforementioned seals are incorporated in a single unit without any additional manufacturing expense and in fact with a reduced number of parts.

Figures 1, 4:
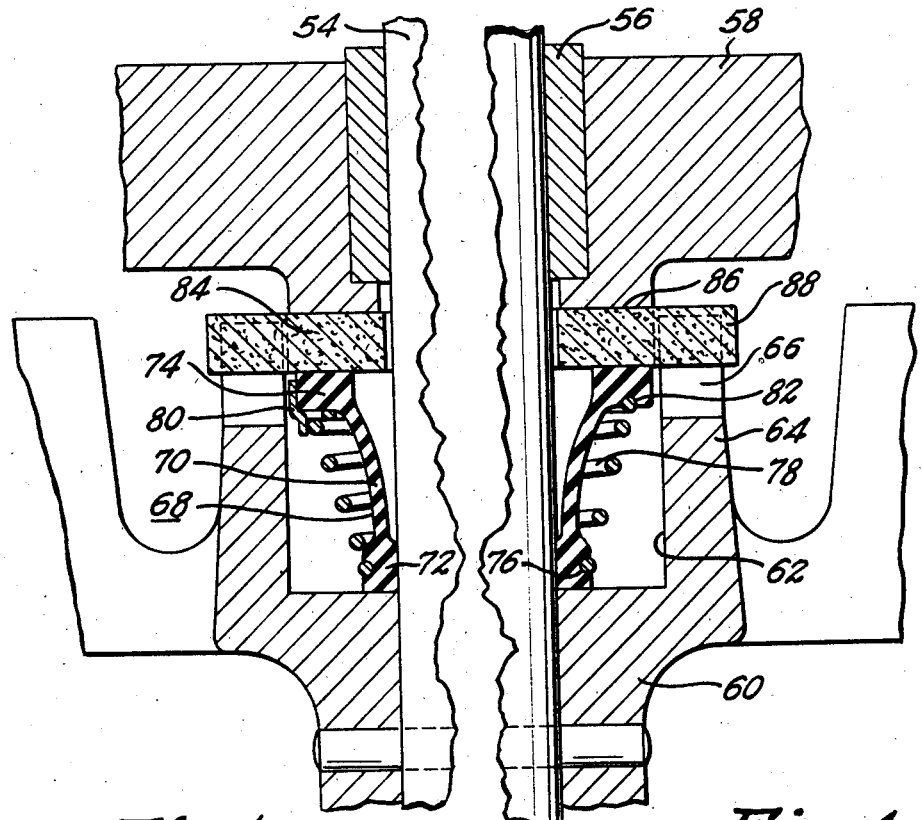
Figure 1 shows a fluid seal wherein the sealing member grips the shaft and rotates therewith.
Figure 4 shows another form of the invention.

The invention shown in Figs. 1 through 4 is a rotating type seal which grips the shaft peripherally thereof and which in the application shown in Fig. 1 and Fig. 4 is used as a seal in an automotive water pump. In these embodiments, a shaft 54 is journaled in a bearing 56, carried by a housing member 58. The outer end of the shaft 54 is hermetically associated with an impeller 60 which includes a cavity 62 therein. The walls 64 of the cavity 62 are slotted at 66 preferably in two places and the function of these slots will be described in detail hereinafter. Fluid seal assembly 68 is adapted to be placed within the cavity 62 and includes a resilient sleeve portion 70 having a reenforced integral end portion 72 thereof and a flange 74 spaced from the portion 72. A groove 76 or shoulder, is moulded in the reenforced portion 72 and is adapted to act as an abutment for the smaller diameter end of a conical spring 78. One end of spring 78 is of less diameter than the diameter of the groove 76 and, therefore, may be snapped into the groove whereby the portion 72 is compressed radially inwardly. The other end of spring 78 bears against flange 74 and, if desired, a spring retaining washer 80 may be used as shown in Fig. 1, or as shown in Fig. 4, the flange 74 may be grooved as at 82 to aid in the placement of the spring. It is apparent that the spring could bear directly against the flange 74 and that no groove such as 82, is necessary but the groove facilitates the placement of the spring if the spring retaining washer is not used.

The seal assembly 68 may be slipped over the shaft 54 since the spring 78 radially compresses the portion 72 of the seal 68, pressing the same over the shaft 54 causes an outward radial expansion whereby a fluid tight joint is provided between the portion 72 of the seal and the shaft 54. The portion 72 is preferably bottomed in the cavity 62. At the other end of the seal 68, portion 74 is adapted to seal against a sealing washer 84 made from Bakelite, carbon, porous metal or other suitable material. The washer 84, in turn, seals against a surface 86, on the housing 58. The washer 84 has ears 88 thereon corresponding in number to the slots 66 in the cavity walls 64 so that the washer 84 turns with the shaft and impeller so that there is substantially no relative rotation between these parts.

It is apparent that the seal 68 and the spring 78 are of sufficient length so that when the impeller is assembled within the housing, the spring 78 is under compression to furnish a sealing pressure between washer 84 and sealing surface 86.

Figures 2, 3:
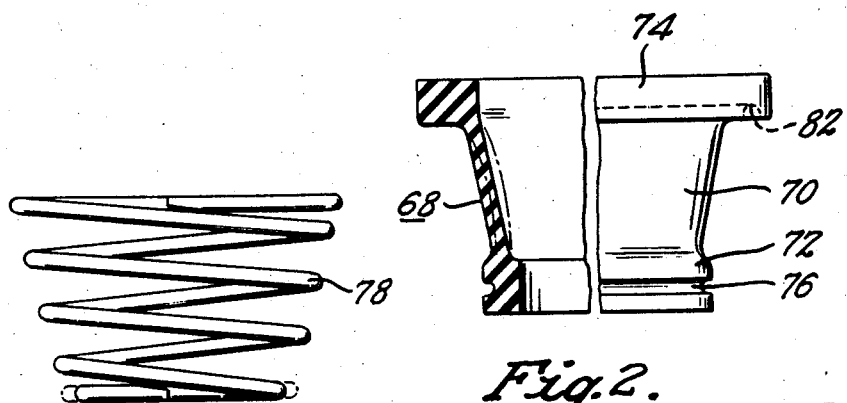
Figure 2 is a part of the fragmentary view of the seal as shown in Fig. 1.
Figure 3 is a view of the spring used in connection with the seal shown in Fig. 1.

In these embodiments, the spring provides a dual function of sealing the seal member radially, as well as, expanding the same axially for forming a second seal. In Fig. 2, the sealing member 68 is shown in its free position wherein the walls thereof are substantially straight. These walls are bowed inwardly when the assembly is compressed as shown in Fig. 1.

The spring 78 preferably has complete loop portions at both ends thereof and the smaller loop portion is obviously radially expansible outwardly to permit the shaft to be passed through the seal member 68 and particularly through portion 72 thereof.

It is apparent that the sealing washer 88 may be eliminated providing the flange portion 74 is made of harder material than the remainder of the sealing member 68, such a type of seal being disclosed in the Geyer Patent No. 2,227,304 assigned to the assignee of the present invention.

While the embodiments of the present invention as herein disclosed, constitute preferred forms, it is to be understood that other forms might be adopted, all coming within the scope of the claim which follows.

What is claimed is as follows:

In a fluid seal for preventing leakage between a rotary shaft and a member through which the rotary shaft is received with clearance: a packing sleeve of elastic composition consisting of an annulus adapted for snug encirclement of a portion of said shaft, a second annulus of larger diameter than the first having a face adapted for axially-directed sealing contact with a complementary surface of said member, and a relatively thin axially-distensible bellows portion intermediate said annuli, integral therewith and capable of flexure into radially variably-spaced relation to the shaft portion encircled thereby, and a tapered coil compression spring member having its small end portion anchored to and constrictively encircling said small annulus enforcing sealing contact thereof with the rotary shaft, having its large end portion in axially-directed abutment with said larger annulus, and having its intermediate convolutions disposed around said bellows portion in normally slightly-spaced relation thereto positively confining said bellows against excessive radial expansion without however interfering with normal flexures thereof incident to operational variations in the mutual spacing of said annuli.

JOHN T. MARVIN.